(12) United States Patent
Fukuda

(10) Patent No.: US 7,162,280 B2
(45) Date of Patent: Jan. 9, 2007

(54) HANDSET FOR A COMMUNICATION UNIT

(75) Inventor: Mikio Fukuda, Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 402 days.

(21) Appl. No.: 10/283,179

(22) Filed: Oct. 30, 2002

(65) Prior Publication Data
US 2003/0083116 A1 May 1, 2003

(30) Foreign Application Priority Data
Oct. 30, 2001 (JP) .............................. 2001-333221

(51) Int. Cl.
*H04B 1/38* (2006.01)
(52) U.S. Cl. .................... 455/575.1; 455/90.3
(58) Field of Classification Search ............... 455/551, 455/415, 453, 550.1, 575.1; 379/441, 433; 340/825.56; 381/66
See application file for complete search history.

(56) References Cited

U.S. PATENT DOCUMENTS

| 4,463,222 A | | 7/1984 | Paradowski | |
|---|---|---|---|---|
| 5,136,639 A | * | 8/1992 | Brito | ............... 379/441 |
| 5,857,157 A | * | 1/1999 | Shindo | ............... 455/551 |
| 6,173,058 B1 | * | 1/2001 | Takada | ............... 381/66 |
| 6,421,444 B1 | * | 7/2002 | Van Schyndel | ........ 379/433.01 |
| 6,547,620 B1 | * | 4/2003 | Hatamura et al. | .......... 455/415 |
| 6,957,049 B1 | * | 10/2005 | Takeda | ............... 455/90.3 |
| 2001/0028311 A1 | * | 10/2001 | Kumar | ................. 340/825.56 |

FOREIGN PATENT DOCUMENTS

| DE | 19 18 985 A | 11/1969 |
|---|---|---|
| EP | 0496235 | 7/1992 |
| JP | 2000324217 A | 11/2000 |
| WO | WO 94/03007 A | 2/1994 |

* cited by examiner

*Primary Examiner*—Jean Gelin
*Assistant Examiner*—Phuoc Doan
(74) *Attorney, Agent, or Firm*—Browdy and Neimark, PLLC

(57) ABSTRACT

A handset (1) for a communication unit is free from any howling problem even when an output of a speaker is considerably increased in use, wherein a conventional handset often suffers from the howling problem when the output of the speaker is considerably increased. In the handset (1) provided with a casing (11): a bone conduction speaker is housed in an upper portion of the casing (2); a microphone is housed in a lower portion of the casing (2); and, a sound aperture (5) of a microphone portion (4) of the casing (11), in which portion (4) the microphone is housed, is formed in a bottom surface of the casing (2) and/or a lower end side surface of the casing (2).

3 Claims, 3 Drawing Sheets

HANDSET FOR A COMMUNICATION UNIT

BACKGROUND OF THE INVENTION

1. Field of the Invention

The present invention relates to a handset for a communication unit, and more particularly to a handset for a communication unit such as a telephone set, a cell phone and like communication units each provided with a bone conduction speaker and a microphone.

2. Description of the Related Art

In general, a conventional handset for a communication unit has a construction such as one shown in FIG. 4. More specifically, the handset has a casing 11'. The casing 11' is provided with a speaker portion 12' and a microphone portion 13' in its upper end portion and its lower end portion, respectively. A speaker and a microphone are incorporated in the speaker portion 12' and the microphone portion 13' of the handset, respectively. In use, a user has the speaker portion 12' of the handset brought into contact with his or her ear and has the microphone portion 13' of the handset disposed in the vicinity of his or her mouth to communicate with his or her partner in communication.

When a user normal in the sense of hearing uses the conventional handset having the above construction, there is no need for such a normal user to excessively increase an output of the speaker in sound pressure level. In this case, therefore, there is no fear that a so-called "howling" problem occurs. In contrast with this, when a user poor in the sense of hearing uses the conventional handset, he or she must increase the output of the speaker in sound pressure level to compensate for his or her poor hearing ability. This often causes the howling problem between the speaker and the microphone both housed in the same casing of the conventional handset. Particularly, the howling problem is very often recognized in the conventional handset employing a bone conduction speaker as its speaker component.

The reason why the conventional handset employing the bone conduction speaker often suffers from the howling problem is that: a voice sound to be transmitted is transmitted through kinetic vibrations in the bone conduction speaker; a face-abutting surface 14' (shown in FIG. 4) of the casing 11' in the conventional handset serves as a vibrating plate or diaphragm to enhance the kinetic vibrations; and, the microphone is mounted on the same face-abutting surface 14 of the conventional handset, and therefore effectively picks up the kinetic vibrations there of to often cause the howling problem. Further, in order to obtain a sufficiently large output of the bone conduction speaker, it is necessary to apply a sufficiently large input on the bone conduction speaker. This also increases the possibility of occurrence of the howling problem in the conventional handset employing the bone conduction speaker.

Further, when the user covers or grasps the speaker portion 12' and/or the microphone portion 13' of the conventional handset with his or her hand in use, the output of the speaker is reflected at both the user's hand and the casing of the conventional handset. As a result, the sound pressure level applied to the microphone often reaches a value of 20dB or more at maximum to cause the howling problem. This is shown in a diagram of FIG. 5, wherein: a kinked-line graph "A" shows, in value, the sound pressure level applied to the microphone which is substantially free from any contact; and, another kinked-linegraph "B" shows, in value, the sound pressure level applied to the microphone housed in the microphone portion 13', which is covered with the user's hand.

SUMMARY OF THE INVENTION

As described above, the conventional handset suffers from the howling problem when the user is poor in the sense of hearing. Due to this, it is an object of the present invention to provide a handset for a communication unit such as a telephone set, a cell phone and like communication units each provided with a bone conduction speaker and a microphone, wherein the handset is substantially free from any howling problem even when the user considerably increases an output of the speaker in sound pressure level in use.

In accordance with a first aspect of the present invention, the above object of the present invention is accomplished by providing:

In a handset (1) for a communication unit including: a casing (2); a bone conduction speaker portion (3) received in an upper portion of the casing (2); and, a microphone portion (4) provided with a first sound aperture (5) for receiving a voice sound and received in a lower portion of the casing (2), the improvement wherein: the sound aperture (5) is formed in a bottom surface of the casing (2).

In accordance with a second aspect of the present invention, the above object of the present invention is accomplished by providing:

The handset (1) for the communication unit including: a casing (2); a bone conduction speaker portion (3) received in an upper portion of the casing (2); and, a microphone portion (4) provided with a second sound aperture (a) for receiving a voice sound and received in a lower portion of the casing (2), the improvement wherein: the sound aperture (a) is formed in a lower endside surface of the casing (2).

In accordance with a third aspect of the present invention, the above object of the present invention is accomplished by providing:

The handset (1) for the communication unit including: a casing (2); a bone conduction speaker portion (3) received in an upper portion of the casing (2); and, a microphone portion (4) provided with sound apertures (5) (a) for receiving a voice sound and received in a lower portion of the casing (2), the improvement wherein: the sound apertures (5) (a) are respectively formed in each of a bottom surface and a lower endside surface of the casing (2).

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1:
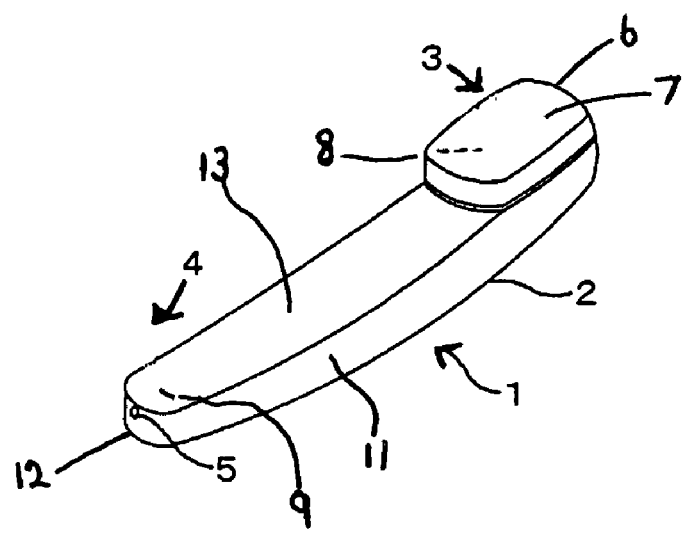
FIG. 1 is a perspective view of an embodiment of the handset for the communication unit according to the present invention.

As shown in FIG. 1, a handset 1 of the present invention for a communication unit is provided with a casing 2. Formed in the casing 2 are: a speaker portion 3 in which a bone conduction speaker is incorporated; and, a microphone portion 4 in which a microphone is incorporated.

Figure 2:
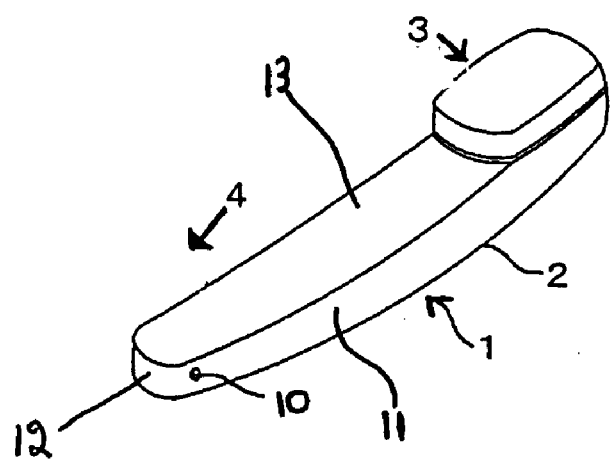
FIG. 2 is a perspective view of another embodiment of the handset for the communication unit according to the present invention.

As viewed in FIGS. 1 and 2, in general, the speaker portion 3 is entirely projected away from upper casing surface 13 at an upper end portion of the casing 2 to form a terrace-like projection portion 6, which is provided with a terrace surface (i.e., face-abutting surface 7). A bone conduction speaker 8 is, directly or through a suitable cushioning 20 member, mounted in the interior of the speaker portion 3 of the casing 2. Since the bone conduction speaker 8 is used to transmit a voice sound through a kinetic vibration called "bone conduction sound", it is necessary for the speaker portion 3 of the casing 2 to be brought into close contact with the user's head in the vicinity of his or her ear.

The microphone 9 housed in the microphone portion 4 of the casing 2 is used to pick up the voice sound as an electrical signal. The microphone portion 4 is formed in a lower end portion of the casing 2 and has sound apertures 5,10 formed in a side wall surface 11 at the bottom end 12 and along the longitudinal axis of casing 2 and/or on the side wall surface 11 above the end 12 of the casing 2. In the embodiment shown in FIG. 1, a sound aperture 5 is formed only at the bottom end 12 of the casing 2. In another embodiment shown in FIG. 2, a sound aperture 9 is formed only in the side wall surface 11 above the bottom end 12 of the casing 2. However, it is possible to form a sound aperture in any other suitable portion of the casing 2 in accordance with the present invention.

Figure 3:
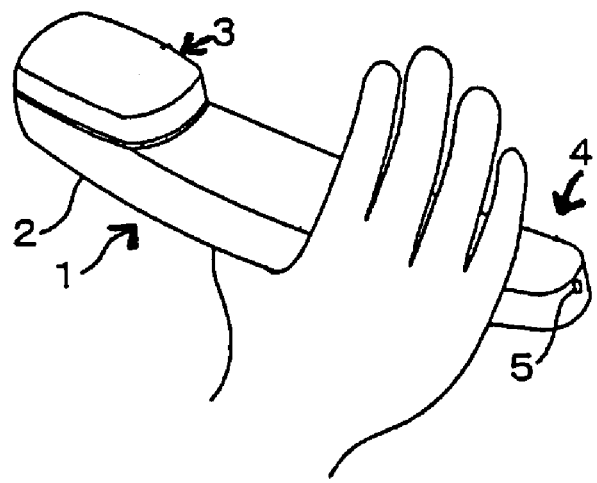
FIG. 3 is a perspective view of the handset of the present invention in use.
Figure 4:
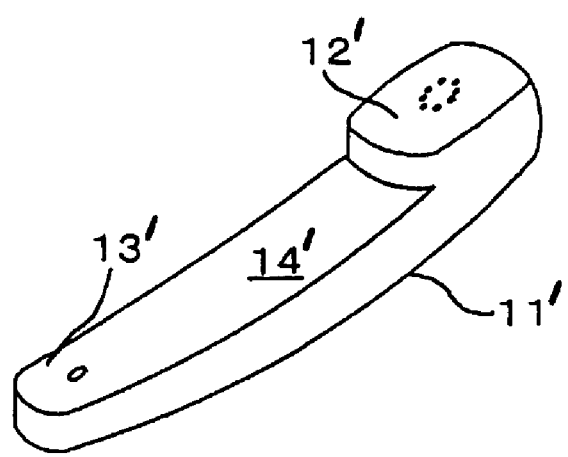
FIG. 4 is a perspective view of the conventional handset for a communication unit.
Figure 5:
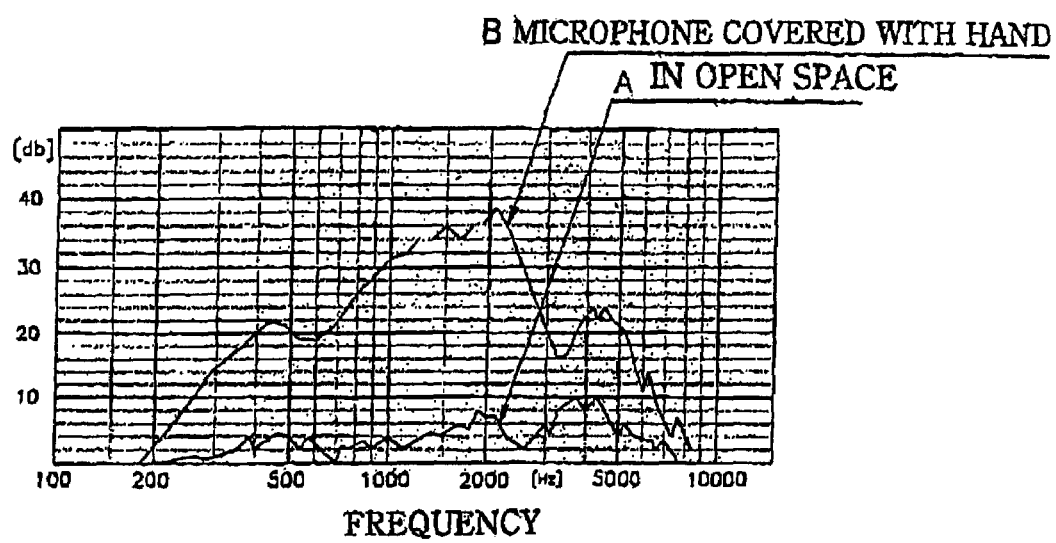
FIG. 5 is a diagram showing the output of the microphone of the conventional handset when a predetermined voltage is applied to the speaker of the conventional handset for the communication unit.

In the handset of the present invention having the above construction, the sound apertures 5 and/or 10 of the microphone is formed in a surface of the casing 2 other than a vibrating surface (i.e., face-abutting surface) of the speaker portion 3 in which the bone conduction speaker is housed. Incidentally, the vibrating surface of the speaker portion 3 corresponds to the above-mentioned terrace surface 7 of the terrace-like portion of the casing 2. Consequently, as is clear from FIGS. 1 and 2, the sound apertures 5 and/or 10 of the casing 2 are arranged as separately as possible from the speaker portion 3 of the casing 2 in position. Due to this arrangement, it is hard for the howling to occur in the handset of the present invention. Further, in use, there is no fear that the sound apertures 5 and/or 10 thus arranged are covered with the user's hand holding the handset of the present invention, as is clear from FIG. 3.

Due to the above arrangement according to the present invention, the handset of the present invention is substantially free from any howling problem even when the user considerably increases the output of the bone conduction speaker in sound pressure level in use. In contrast with this, the conventional handset often suffers from the howling problem since it has a construction in which both the speaker and the microphone are mounted on the same flush surface of the casing of the handset.

The handset of the present invention has the above construction. Due to this, it is possible for the handset of the present invention to effectively prevent the howling from occurring even when the output of the speaker is considerably increased by the user, for example such as ones handicapped in the sense of hearing. This ensures excellent communication conditions of the handset of the present invention in use.

Finally, the present application claims the convention priority based on Japanese Patent Application No.2001-333221 filed on Oct. 30, 2001, which is herein incorporated by reference.

What is claimed is:

1. In a handset (1) for a communication unit including: a casing (2); a bone conduction speaker portion (3) inseparably fixed in a terrace portion (6) which projects in a transverse direction away from an upper casing surface (13) at an upper portion of said casing (2); and, a microphone portion (4) provided with a sound aperture (5) for receiving a voice sound fixed in a lower portion of said casing (2), the improvement wherein:

said sound aperture (5) is fixed in a side wall surface (11) at a bottom end (12) of said casing spaced apart at a defined distance from the bone conduction speaker portion fixed in the terrace portion.

2. The handset (1) for the communication unit including: a casing (2); a bone conductor speaker portion (3) inseparably fixed in a terrace portion which projects in a transverse direction away from an upper casting surface (13) at an upper portion of said casing (2); and, a microphone portion (4) provided with a sound aperture (9) for receiving a voice sound fixed in a lower portion of said casing (2), the improvement wherein:

said sound aperture (9) is fixed in a side wall surface (11) above and near a bottom end (12) of said casing (2) spaced apart at a defined distance from the bone conduction speaker fixed in the terrace portion.

3. The handset (1) for the communication unit including: a casing (2); a bone conductor speaker portion (3) inseparably fixed in a terrace portion (6) which projects in a transverse direction away from an upper casing surface (13) at an upper portion of said casing (2); and, a microphone portion (4) provided with sound apertures (5) (9) for receiving a voice sound fixed in a lower portion of said casing (2), the improvement wherein:

a first sound aperture (5) of said sound apertures is fixed in a side wall (11) at a bottom end (12) of said casing (2), and a second aperture (9) of said sound apertures is fixed in the side wall surface (11) above and near the bottom end (12) of said casing (2);

wherein the first sound aperture and the second sound aperture are each spaced apart at a defined distance from the bone conduction speaker portion fixed in the terrace portion.

* * * * *